United States Patent [19]

Manalastas et al.

[11] Patent Number: 5,187,011
[45] Date of Patent: Feb. 16, 1993

[54] COMPOSITION COMPRISING ENCAPSULATED SUBSTRATE WITH THERMOPLASTIC POLYMER OVERCOATING

[75] Inventors: Pacifico V. Manalastas, Edison; Evelyn N. Drake, Bernardsville; Edward N. Kresge, Watchung; Warren A. Thaler, Flemington, all of N.J. Lee A. McDougall, Houston; John C. Newlove, Kingwood, both of Tex.; Vijay Swarup, Clinton, N.J.; Albert J. Geiger, Fort Saskatchewan, Canada

[73] Assignee: Exxon Research and Engineering Company, Florham Park, N.J.

[21] Appl. No.: 819,304

[22] Filed: Jan. 9, 1992

Related U.S. Application Data

[60] Division of Ser. No. 676,662, Mar. 28, 1991, Pat. No. 5,110,486, which is a continuation-in-part of Ser. No. 637,391, Jan. 4, 1991, Pat. No. 5,102,559, and Ser. No. 637,401, Jan. 4, 1991, Pat. No. 5,102,558, said Ser. No. 637,391, and Ser. No. 637,401, each is a continuation-in-part of Ser. No. 446,572, Dec. 4, 1989, abandoned, Ser. No. 446,573, Dec. 4, 1989, abandoned, Ser. No. 446,736, Dec. 6, 1989, abandoned, Ser. No. 446,831, Dec. 6, 1989, abandoned, and Ser. No. 446,958, Dec. 6, 1989, abandoned.

[51] Int. Cl.$^5$ .................... B32B 27/06; B32B 27/00
[52] U.S. Cl. .................... 428/402.24; 504/116; 428/403; 428/407; 428/500; 428/517; 428/334; 427/213; 427/214; 71/28; 71/64.02; 71/64.11; 424/408; 525/344; 524/364; 524/547
[58] Field of Search .......... 428/402.2, 402.21, 402.22, 428/402.24, 403, 407, 500, 517, 334; 427/212, 214; 71/6, 28, 119, 64.02, 64.07, 64.11; 524/547, 364; 525/344

[56] References Cited

U.S. PATENT DOCUMENTS

| | | | |
|---|---|---|---|
| 3,788,322 | 1/1974 | Michaels | 424/453 |
| 4,118,361 | 10/1978 | Lundberg | 524/364 |
| 4,282,130 | 8/1981 | Lundberg et al. | 524/364 |
| 4,285,851 | 8/1981 | Makowski et al. | 525/344 X |
| 4,304,702 | 12/1981 | Makowski et al. | 525/344 |
| 4,313,862 | 2/1982 | Lundberg et al. | 524/364 |
| 4,322,329 | 3/1982 | Lundberg et al. | 524/389 |
| 4,361,658 | 11/1982 | Lundberg et al. | 523/132 |
| 4,387,174 | 6/1983 | Lundberg et al. | 524/66 |
| 4,412,028 | 10/1983 | Lundberg et al. | 524/364 |
| 4,483,960 | 11/1984 | Agarwal et al. | 524/499 |
| 4,552,679 | 11/1985 | Schobel et al. | 427/221 |
| 4,627,850 | 12/1986 | Deters et al. | 424/21 |
| 4,701,204 | 10/1987 | Duvdevani et al. | 71/28 |
| 4,741,401 | 3/1988 | Walles et al. | 166/308 |
| 4,741,956 | 5/1988 | Thaler et al. | 428/403 X |
| 4,788,081 | 11/1988 | Thaler et al. | 427/212 |
| 4,935,301 | 6/1990 | Rerup et al. | 428/375 |
| 4,979,980 | 12/1990 | Thaler et al. | 71/64.02 |
| 4,988,377 | 1/1991 | Manalastas et al. | 71/28 |
| 4,997,470 | 3/1991 | Thaler et al. | 71/65 |
| 5,006,147 | 4/1991 | Thaler et al. | 71/27 |

*Primary Examiner*—Robert L. Stoll
*Assistant Examiner*—C. Sayala
*Attorney, Agent, or Firm*—Jay Simon

[57] ABSTRACT

An encapsulated breaker chemical composition used in an oil or gas stimulation operation which comprises: a breaker chemical; and a pinhole free coating of an ionically and covalently crosslinked neutralized sulfonated elastomeric polymer of about 2 to about 80 microns thick deposited onto the surface of the breaker chemical, wherein said polymer encapsulates the breaker chemical, wherein the polymer is permeable to the breaker chemical and the polymer is non-reactive to the breaker chemical.

6 Claims, 2 Drawing Sheets

COMPOSITION COMPRISING ENCAPSULATED SUBSTRATE WITH THERMOPLASTIC POLYMER OVERCOATING

CROSS-REFERENCE TO RELATED APPLICATIONS

This is a continuation, of application Ser. No. 676,662, filed Mar. 28, 1991, now U.S. Pat. No. 5,110,486, which is a continuation-in-part of copending applications Ser. No. 637,391 now U.S. Pat. No. 5,102,559 and 637,401, now U.S. Pat. No. 5,102,558 each filed Jan. 4, 1991 which in turn are continuations-in-part of applications Ser. No. 07/446,572 and 07/446,573, each filed on Dec. 4, 1989 and Ser. Nos. 07/446,736, 07/446,831, and 07/446,958, each filed on Dec. 6, 1989, all abandoned.

FIELD OF THE INVENTION

The present invention relates to encapsulated breaker chemicals which are used in fracturing fluid systems. The encapsulated breaker chemical comprises a breaker chemical which is encapsulated within an ironically and covalently crosslinked elastomeric coating which is suitable permeable to permit the breaker chemical to be released through the coating into the fracturing fluid. The polymeric coating of the instant invention comprises an ionically and covalently crosslinked neutralized sulfonated elastomeric polymer.

DESCRIPTION OF PRIOR ART

Solids (e.g., substrates, pipes, slabs, sheets, etc.) can be protected from the external environment with the use of barrier or protective coating materials. For protection from water of moisture, polymer or organic materials are widely used. For coating effectiveness, however, these materials are generally applied as thin films. The thickness of the film depends upon the desired degree of water protection. The thicker the film the more likely that water penetration will be slowed down. In practice, applying an effective thin coating is difficult because of the various stresses tending to make the film discontinuous (e.g., film-rupture, pin holes). Films will rupture when a threshold stress is exceeded. The lateral stress tending to rupture a film is inversely proportional to an exponential power of the film thickness. The thinner the film, the more easily it will rupture.

There are many applications for thickened or gelled solutions of polymers in aqueous of organic liquids which are quite diverse. There are also a number of physical and chemical techniques for preparing such systems. Such systems are used for viscosity control, solids carrying and fluid loss control in fracturing fluids or to place sand or gravel packs downhole in oil or gas wells.

Many types of fluids are available for use in wellbore fracturing procedures. Chief properties required by the fracturing fluids are low leak off rate, the ability to carry a propping agent and low pumping friction loss. The fluid should also be easy to remove from the formation; it should be compatible with natural formation fluids; and it should cause a minimum of damage to the formation permeability. These properties can be achieved with oil based fluids, water based fluids, emulsions, foam, and other multi-phase suspensions.

A fracturing process used in a well treating operation involves the introduction into the well of a fluid under sufficient hydraulic pressure to produce or enlarge fractures in the subterranean formation. The fracturing fluid usually contains a propping agent such as sand, sintered alumina, glass beads, aluminum spacers, urea prills or nutshells, wherein the propping agent is deposited within the fracture in order to maintain the fracture in an open mode or alternatively, an acid is contained within the fracturing fluid wherein the acid reacts with acid reactable components of the subterranean formation thereby creating and enlarging the fracture so that one obtains increased flow of fluids from the subterranean formation. The propping agent is suspended within a polymeric gel or a highly viscous polymeric solution. After the highly viscous fluid has been pumped into the fracture and the fracture is formed or enlarged, it is desirable that the highly viscous fluid be converted into a low viscosity fluid so that the fluid can be removed from the fracture thereby leaving the propping agent within the fracture. The removal of the fluid is necessary so that the oil or gas can flow back through the fracture into the well bore. The conversion of the highly viscous solution into the lower viscosity fluid is called breaking the gel. The breaking of the gel is accomplished by adding a breaker chemical to the gel at the appropriate time. It is critical that the breaking process does not prematurely occur prior to the completion of the fracturing process. The usual method of addition of the breaker chemical is to pump it through the well bore into the fracture upon completion of the fracturing process, but this presents the problem of having the breaker chemical completely mix with the viscous fluid within the fracture to maximize breaking of the gel.

The use of breaker systems to break viscous water gels and fluids is not of itself new. Systems describing these chemicals are found, for example, in U.S. Pat. Nos. 3,167,510; 3,816,151; 3,960,736; 4,250,044 and 4,506,734. But most of these breakers are applied after introduction of the fracturing fluid into the wellbore because these breakers immediately start to degrade the viscosity enhancer in the fracturing fluid upon contact thereby lowering the efficiency of the fracturing process. In such cases, additional time and labor are needed to effect the reduction of the viscosity of fracturing fluids introduced into the subterranean formation. The use of organic breakers such as alkyl formate may alleviate this problem, since they can be applied along with the fracturing fluid. But these types of breakers rely on certain subterranean conditions, such as elevated temperature and time, to effect a viscosity reduction of the fracturing fluid. Since these organic breaker chemicals work on chemical change, such as hydrolysis, they are slow in effecting viscosity reduction. Furthermore, their performance can be unpredictable.

Accordingly, the incorporation of a breaker chemical into the fracturing fluid prior to the pumping of the fracturing fluid into the well bore and well fractures is desirable. The breaker chemical must be in a passive, non-reactive state such that it cannot react with the viscous fluid of the fracturing well prior to the injection of the fracturing fluid into the fractures, but the breaker chemical must be capable of reacting with the viscous fluid of the fracturing fluid within the fracture upon the completion of the fracturing process. The present invention teaches a method of accomplishing this objective.

Physical properties of hydrocarbon polymers can be altered significantly by introducing a small number of ionic groups into the polymer backbone. The property changes are caused by ionic crosslinks formed by association of the ionic groups. Lightly sulfonated elastomeric polymers such as sulfonated EPDM (ethylene-propylene-diene terpolymer) exhibit this property. We have recently found that the physical properties of ionically crosslinked polymers can be further altered by the addition of covalent crosslinks.

Because of their improved barrier properties, ionically and covalently crosslinked sulfonated polymers can be used to make cost effective controlled release breaker chemicals. The benefits obtained by the use of these coatings can include labor savings, increased breaker utilization efficiency, time savings and reduction in residual damage to the well caused by residual gels.

SUMMARY OF THE INVENTION

The present invention relates to encapsulated breaker chemicals which are used in a process for forming and enlarging fractures in a subterranean formation in oil well stimulation operations. The encapsulated breaker chemical is added above ground to the fracturing fluid which comprises a viscous or gelled polymeric solution, a propping agent, the encapsulated breaker chemical and other additives commonly used in fracturing fluids. The encapsulated breaker chemical comprises a breaker chemical having an ionically and covalently crosslinked elastomeric coating deposited on the surface of the breaker chemical, wherein the coating, having a thickness of at least about 1 micron, preferably from about 1 to about 100 microns, more preferably from about 2 to about 80 microns, and most preferably from about 5 to about 70 microns, encapsulates the breaker chemical. The coating must be of a composition which is not degraded by the breaker chemical and will be permeable to the breaker chemical at conditions of use. The coating of the instant invention comprises a neutralized ionically and covalently crosslinked sulfonated elastomeric polymer, preferably a neutralized sulfonated terpolymer of ethylene, propylene and a non-conjugated diene (EPDM terpolymer).

DETAILED DESCRIPTION OF THE INVENTION

The present invention relates to an encapsulated breaker chemical composition used in a fracturing process in the production of oil or gas which comprises: (a) a breaker chemical; and (b) a pinhole free coating of an ionically and covalently crosslinked neutralized sulfonated elastomeric polymer having a preferred thickness of about 2 to about 80 microns deposited onto the surface of the breaker chemical, wherein said polymer encapsulates said breaker chemical, wherein said polymer will be permeable to said breaker chemical under conditions of use and said polymer is non-reactive to said breaker chemical.

The sulfonated (sulfo) elastomeric polymers which are preferred for the purposes of this invention are water insoluble and include sulfonated copolymers of ethylene and propylene, sulfonated terpolymers of ethylene, propylene and a diene, preferably a non-conjugated diene (EPDM), sulfo Butyl rubber, sulfo isoprene/styrene rubber, sulfo isoprene/butadiene rubber, sulfo isoprene/butadiene/styrene copolymers, sulfo isobutylene/styrene copolymers, sulfo isobutylene/para methyl styrene copolymers, and complexes of the aforementioned polymers with a nitrogen containing polymer such as vinyl pyridine copolymer.

The more preferred neutralized sulfonated elastomers of the instant invention are selected form the group consisting of sulfonated Butyl rubber, sulfonated EPDM terpolymer and a complex of sulfonated EPDM terpolymer with a vinylpyridine copolymer.

The water insoluble sulfonated polymers of the instant invention will comprise from about 4 to about 200 milliequivalents of pendant sulfonate groups per 100 grams of polymer, more preferably from 10 to 100 meq. pendant sulfonate groups. The sulfonated elastomers utilized in the instant invention are neutralized with transition elements selected from Groups IVA, VA, VIA, VIIA, VIIIA, IB, and IIB of the Periodic Table of Elements and lead, tin, and antimony, as well as ammonium and amine counterions. Zinc and sodium neutralizing ions (as ionic salts, e.g., acetate or hydroxide) are preferred.

Neutralization of the cited polymers with appropriate metal hydroxides, metal acetates, metal oxides or ammonium hydroxide, etc. can be conducted by means well known in the art. For example, the sulfonation process as with Butyl rubber, containing a small 0.3 to 1.0 mole percent unsaturation, can be conducted in a suitable solvent, such as toluene, with acetyl sulfate as the sulfonating agent such as described in U.S. Pat. No. 3,836,511, incorporated herein by reference. The resulting sulfonic acid derivative can then be neutralized with a number of different neutralization agents such as sodium phenolate and similar metal salts. The amounts of such neutralization agents employed will normally be stoichiometrically related to the amount of free acid in the polymer. It is preferred that the amount of neutralizing agent employed is in an excess percent to ensure full neutralization. The use of an excess of such neutralization agent is necessary to effect at least 50 percent neutralization of the sulfonic acid groups present in the polymer, preferably at least 90 percent, and most preferably essentially complete neutralization of such acid groups should be effected.

Thus, the degree of neutralization of said sulfonate groups may vary from 50 to 100 mole percent. With the utilization of neutralized sulfonates in the instant invention, it is preferred that the degree of neutralization be substantially complete, that is, with no substantial free acid present and without substantial excess of the base, other than that needed to ensure neutralization. The neutralized sulfonates possess greater thermal stability compared to their acid form and are ionically crosslinked. Thus it is clear that the polymers which are normally utilized in the instant invention comprise substantially neutralized pendant groups and, in fact, an excess of the neutralizing material may be utilized without defeating the objects of the instant invention.

The sulfonated elastomer polymers of the instant invention may vary in number average molecular weight from 1,000 to 10,000,000 preferably 5,000 to 1,000,000 most preferably from 10,000 to 600,000. These polymers may be prepared by methods known in the art, for example, see U.S. Pat. No. 3,642,728, incorporated herein by reference.

The most preferred sulfonated polymers for use in the instant invention are sulfonated ethylene/propylene terpolymers which may be prepared by the procedures described in U.S. Pat. No. 3,870,841, incorporated herein by reference.

The sulfonated polymers of the instant invention may be neutralized prior to incorporation into organic solvent or by neutralization of the acid form in situ. For example, preferably the acid derivative is neutralized immediately after preparation. For example, if the sulfonation of an EPDM terpolymer is conducted in solution, then the neutralization of that acid derivative can be conducted immediately following the sulfonation procedure. The neutralized polymer may then be isolated by means well known to those skilled in the art, i.e., coagulation, steam stripping, or solvent evaporation, because the neutralized polymer has sufficient thermal stability to be dried for employment at a later time in the process of the instant invention. It is well known that some unneutralized sulfonic acid derivatives do not possess good thermal stability and the above operations avoid that problem. The sulfonated polymer may also be sprayed onto the breaker chemical directly from the synthetic solution without isolation from the solvent.

The neutralized water insoluble sulfonated polymers may be covalently crosslinked after application to the breaker chemical by a number of techniques more specifically described hereinafter. One method involves forming a solution of the polymer in an organic solvent and adding to that solution a crosslinked agent which is not activated until a temperature of 40° C. is obtained. After application of this coating to the substrate, the coated substrate is subjected to drying temperatures in excess of 40° C. to activate the crosslinking agent thereby covalently crosslinking the sulfonated polymer.

An alternative crosslinking process comprises coating an organic solution of the water insoluble sulfonated polymer on the substrate and subsequently subjecting the coated substrate to an electron beam thereby covalently crosslinking the water insoluble sulfonated polymer.

A still alternate process comprises coating the substrate with the water insoluble sulfonated polymer and subsequently contacting the coated substrate with a vapor or solution of sulfur monochloride thereby forming a covalently crosslinked polymer. Sulfur monochloride can also be added directly to the organic solution of the polymer immediately prior to coating.

It is also within scope of this invention that any two or more of these processes may be used in conjunction to crosslinked the water insoluble sulfonated polymer.

The coating components of the present invention, including any crosslinking agent which may be present, are dissolved in an organic solvent to form a solution with a concentration level of about 0.1 to 20 weight percent, more preferably from about 0.5 to about 10.0 weight percent and most preferably from about 0.5 to about 6.0 weight percent. The solvent system comprises an organic solvent with or without a polar cosolvent, such as alcohol or amine. The solvent can be an organic liquid which is capable of dissolving the polymeric backbone. A cosolvent may be needed to break up associated domains resulting from aggregation of ionic species.

As discussed above, a variety of polymer backbones will display the desirable properties discovered in this invention.

Specific examples of organic liquids to be employed as solvents for the polymers include:

| Polymer | Organic Liquid |
| --- | --- |
| Sulfonated ethylene-propylene terpolymer | aliphatic and aromatic solvent oils such as Solvent "100 Neutral", "150 Neutral", and similar oils; benzene; diesel oil; toluene; xylene; ethyl benzene; pentane; hexane; heptane; octane; isooctane; nonane; decane; and ketone solvents. |
| sulfonated polystyrene | benzene, toluene, ethyl benzene, methyl ethyl ketone, xylene, styrene, ethylene dichloride, and methylene chloride |

In order to reduce the viscosity of the organic hydrocarbon solution of the sulfonated polymer so as to be able to employ the organic hydrocarbon solution in a fluidized bed process, a polar cosolvent may be added to the organic hydrocarbon solution of the sulfonated elastomeric polymer to solubilize the pendant ionomeric groups. The polar cosolvent will have a solubility parameter of at least 10.0, more preferably at least 11.0, and may comprise from 0.0001 to 15.0 weight percent, preferably 0.001 to 5.0 weight percent, of the total mixture of organic liquid, water insoluble ionomeric polymer and polar cosolvent.

Normally, the polar cosolvent will be a liquid at room temperature, however, this is not a requirement. It is preferred, but not required, that the polar cosolvent be soluble or miscible with the organic liquid at the levels employed in this invention. The polar cosolvent may be selected from the group consisting of alcohols, amines, ammonia, di- or tri-functional alcohols, amides, acetamides, phosphates, or lactones and mixtures thereof. Especially preferred polar cosolvents are aliphatic alcohols such as methanol, ethanol, n-propanol, isopropanol, 1,2-propane diol, monoethyl ether of ehtylene glycol and n-ethylformamide.

The coating of any solid particulates such as the breaker chemical of fracturing fluid breaker systems can be achieved by applying the organic solution of the sulfonated polymer, optionally containing the covalent crosslinking agent, over the substrate at an ambient temperature of 10°–70° C. Where the solution contains a crosslinking agent, care should be taken to insure that the application temperature is significantly lower than the temperature at which the covalent crosslinking agent is activated. Coating is achieved by either dip-coating or spray coating onto a cascading stream of granules through an appropriate technique such as fluidized bed coating. Examples of fluidized bed coating processes are conventional spray coating wherein the solid particulates are coated by spraying the coating solution above or below the bed in a Wurster configuration or a fluidized bed with a rotating bed support plate. It is envisioned that coated solid inorganic or organic breaker systems or other particulates can be utilized in a variety of environmental conditions and yet the release of the breaker or other water soluble component of the breaker can be controlled in such a way that they are available when the reduction of viscosity is needed.

After the coating solution is applied, the organic solvent solution is dried by evaporation with or without the aid of forced drying gas, such as air-or nitrogen gas. The drying gas temperature can be from ambient temperature up to the boiling point of the organic solvent system. Preferably the temperature of the drying gas is between 20° C. to 100° C. The most preferred temperature of the drying gas should be from about 50° to about 70° C. for fast evaporation of the organic solvent system. After drying, the thickness of the applied coating should be about 1 micrometer to about 100 micrometers. Most preferred, the coating thickness should be about 5 to about 80 micrometer for both performance and economic reasons. To control the quality of the applied coating, the solution concentration of the sulfonated polymer should be within the 0.1 to 20 weight percent range set forth above.

The coatings can be applied in single or multiple layers, depending on the desired coating thickness. In any event, the organic solvent system is evaporated after each layer of application. The sulfonated polymer coating can be applied over the substrate of interest or over a previous coating. In the latter case, such practice can modify or improve the performance of the coated system.

An indicated, crosslinking agents may be added to the solution of the sulfonated polymer immediately prior to application of the solution to the substrate.

Covalent crosslinking of the above mentioned polymers can be accomplished using a variety of common vulcanization formulations involving crosslinking organic peroxides, carriers for such crosslinking peroxides, accelerators and sensitizes.

Examples of peroxide crosslinking agents include acetyl cyclohexane sulphonyl peroxide, bis (2-ethylhexyl) peroxydicarbonate, bis (4-tert butyl cyclohexyl) peroxydicarbonate, di-cyclohexyl peroxydicarbonate, di-n-propyl peroxydicarbonate, di-n-butyl peroxydicarbonate, dicetyl peroxydicarbonate, disecbutyl peroxydicarbonate, di-isopropyl peroxydicarbonate, tert butyl peroxyeodecanoate, bis (2,4-dichlorobenzoyl) peroxide, tert butyl peroxypivalate, bis (ortho-methyl benzoyl) peroxide, bis (ortho-methylbenzoyl) peroxide, bis (3,5,5-trimetyl hexanoyl) peroxide, dilauryl peroxide, di-decanoyl peroxide, di-octanoyl peroxide, di-proprionoyl peroxide, di-benzoyl peroxide, tert butyl peroxy-2-ethylhexanoate, tert butyl peroxy diethylacetate, tert butyl peroxy isobutyrate and similar materials.

Carriers for the peroxide include calcium carbonate, clay, ethylene-vinyl acetate copolymer masterbatch, EPDM-masterbatch, silicone oil, plasticizer as well as organic solvents.

Accelerators which may be used include thiazoles, sulfonamides, thiurams, dithiocarbamates, guanidines and thioureas.

Sensitizers which may be used include trialkyl cyanurate, trialkyl isocyanurate, trimethylolpropane trimethyacrylate, and ethylene glycol dimethacrylate.

The concentration of the crosslinking agent in the organic solution is about 0.1 to about 20 weight percent, more preferably about 0.15 to about 15 weight percent and most preferably about 0.17 to about 10 weight percent. The curing of the coating of the sulfonated polymer with the covalent crosslinking agent occurs during the aforementioned drying step of the process at temperatures above 40° C.

Where sulfur monochloride is employed as the crosslinking agent, there are several approaches which may be used to crosslink the coating. In a first embodiment, the substrate particles coated with the dried sulfonated polymeric coating is covalently crosslinked by exposing the coated particles to a saturated vapor of sulfur monochloride at ambient temperature for a sufficient period of time, 1 hour to 48 hours, more preferably 2 to 36 hours, and most preferably 10 to 30 hours, to cause covalent crosslinking. The coated polymer particles may be exposed to vapor by placing them on a screen in a dessicator or in a packed column and exposing the particles to the vapor for a period of time sufficient to cause covalent crosslinking of the sulfonated polymer.

In another variation of this process, the coated particles may be covalently crosslinked by contact with a solution of sulfur monochloride in an organic solvent selected from the group consisting of aliphatic, aromatic and halogenated hydrocarbons. The concentration of sulfur monochloride in the solution should be about 1 to about 50 weight percent, more preferably 2 to 40 weight percent, and most preferably 3 to 30 weight percent. The amount of sulfur monochloride solution used to cross-link the polymer contains enough sulfur monochloride to equal about 1.0 to about 20 weight percent of the weight of polymer in the coating, more preferably about 2.0 to about 15 weight percent and most preferably about 3.0 to about 12 weight percent of the polymer. The solution can be sprayed onto the coated particles by any means which ensures uniform distribution and then the solution is permitted to evaporate.

In yet another embodiment, crosslinking with sulfur monochloride may be carried out by direct addition of sulfur monochloride to the sulfonated polymer solution immediately prior to spray coating. The amount of sulfur monochloride added may range from the weight of about 1.0 to about 20 weight percent based on the weight of the sulfonated polymer to which it is added, more preferably about 2.0 to about 15 weight percent and most preferably about 3.0 to about 12 weight percent of the polymer. The spray coating and drying process is then carried out as described above.

Electron beam radiation may also be used to covalently crosslink the coating. In this process, the elastomer coating is first dried as set forth above. The dried coating is then covalently crosslinked by exposure to electron beam radiation at ambient temperatures for a sufficient period of time (10 to 60 minutes) to cause covalent crosslinking. The electron beam intensity may range from 1 to 50 MRad, preferably 2 to 25 MRad and most preferably 5 to 20 MRad.

The crosslinked elastomers of this invention are slowly permeable to water and essentially impermeable to the breaker chemicals mentioned herein under wellbore conditions. Upon introduction into aqueous fracturing fluids or other aqueous wellbore fluids, the encapsulated substrate slowly absorbs water by diffusion through the polymeric coating. This water dissolves the substrate and sets up an osmotic gradient which in turn draws in more water. Pressure builds up inside the capsule, and it expands until resealable micropores (not pinholes) form in its walls.

Concentrated substrate solution is then ejected through the micropores into the surrounding medium. This relieves the pressure inside the capsule which then shrinks. The micropores reseal, and the process repeats itself until insufficient substrate remains for swelling and micropores to form.

Specific examples of preferred breaker chemicals of the instant invention are selected from the group consisting of ammonium and alkali persulfates, alkyl formates, salicylates, acetates, chlorites, phosphates, laurates, lactates, chloroacetates, enzymes and other solid breakers. The release of the breakers from the coated solid breaker systems can be controlled by the thickness of the sulfonated polymer coating, the degree of sulfonation of the polymer, the degree of neutralization of the sulfonated groups of the sulfonated polymers, the type of cation in the sulfonated polymer, the biodegradability of the sulfonated polymers, and the intrepidity and conformity of application of the polymers.

The chemical forming the core of the encapsulated breaker chemical may be used per se when it is in the form of a finely divided solid or, in another embodiment of the invention, it may be sprayed as a solution or in liquid form onto small, finely divided seed particles to form a coating on these seed particles. Essentially any solid which is of the proper size and which is inert to the breaker chemical (or other active material) may be used as the seed particle but urea is preferred. This embodiment is especially preferred where the breaker chemical is itself a liquid, or is irregular in shape or not of the proper size.

In another embodiment of this invention, the encapsulated breaker chemical, with or without a seed core, may be further overcoated by processes described above with a solution of thermoplastic polymer material which exhibits permeability properties similar to those of the ionically and covalently crosslinked neutralized elastomer coating overlying the breaker chemical. This overcoat layer is particularly useful in reducing the tackiness of the elastomer layer and thereby allows for the application of a thicker elastomer layer. For example, a sulfonated EPDM elastomer layer may become tacky during the coating process and the coated particles tend to stick together. The application of an overcoat layer of thermoplastic polymer removes the tackiness of the previously coated particles so that thicker layers of the sulfo EPDM coating may be achieved.

Preferred thermoplastic overcoat layers are based on sulfonated styrene polymers or copolymers which are also neutralized to the degree set forth above with respect to the elastomeric polymers. The thickness of the thermoplastic layer is generally less than the thickness of the elastomeric layer, and may range from abut 1 to about 20 microns, more preferably from about 1 to about 10 microns, and most preferably from abut 1 to about 5 microns.

Thermoplastic polymers which are most preferred as overcoat layers in accordance with this invention include neutralized sulfonated poly-styrene and neutralized sulfonated poly (p-methyl) styrene having a degree of acid neutralization and a molecular weight within the ranges specified above for the elastomeric polymer.

In a further embodiment of the invention, it may be desirable to overcoat the breaker chemical substrate with a protective sealing layer prior to applying the polymer coating. The protective layer is most important when an oxidizer is the breaker since it protects the breaker chemical from degrading the polymeric coating. It is contemplated that any solid that is inert to the breaker and the ionically and covalently crosslinked neutralized sulfonated EPDM termpolymer may be used as the protective layer as long as it is water soluble and does not change the breaker release through the polymer surface layer. These protective layers also function in the fracturing fluids as a barrier to water soluble components of the fracturing fluid thereby shielding the breaker chemical from the premature release of the breaker chemical into the fracturing fluid. Urea is most preferred as the protective layer.

The coating of any solid particulates such as the breaker chemical with the protective layer can be achieved by spraying in a fluidized bed process a solution of protective layer (such as a aqueous solution of urea) onto a cascading stream of granules to be coated, and drying said granules, to achieve a protective sealing layer thickness within the range of from about 1 to about 30 microns. The coated granules may then be subsequently overcoated with the elastomer using a solution of the elastomer in appropriate solvent.

The preferred breaker chemicals which may be encapsulated in accordance with this invention include ammonium persulfate, sodium persulfate, potassium persulfate, potassium monopersulfate, sodium chlorite, ammonium bifluoride, ammonium fluoride, sodium fluoride, potassium fluoride, sulfamic acid, citric acid, oxalic acid, ammonium sulfate, sodium acetate and enzymes and mixtures thereof.

The breaker chemical can also be used in combination with a polymeric matrix as described in U.S. Pat. No. 4,738,897 incorporated herein by reference, absorbed on a porous solid such as diatomaceous earth or coated on an inert core substrate such as urea as described above.

Other oil well chemical additives can be encapsulated in addition to or in place of the breaker chemicals. These materials when encapsulated will be administered under the same conditions and in the same ways as in normal use. These oil well chemical additives are selected from the group consisting of: scale inhibitors such as polyacrylates, phosphonates and phosphate esters; corrosion inhibitor such as acid amine salts, imidazolines and quaternary amines; demulsifiers such as alkoxylated resins, alkoxylated polyols and alkoxylated polyesters; biocides such as glutaraldehydes, isothiazolinones and dithiocarbamates; paraffin inhibitors such as ethylene vinyl acetate copolymers, alpha olefin maleate and furmarate polyesters, and vinyl acetate; foamers such as ether sulfates, alpha olefin sulfonates and quaternary amines; cement accelerators such as calcium chloride and aluminum chloride; and gas migration agents such as latex rubbers and aluminum powders.

It is also within the scope of this invention that other inorganic and organic materials may be encapsulated with the crosslinked polymeric coating system of this invention such as materials used in agricultural applications, wherein these agricultural materials are selected from the group consisting of urea fertilizers, herbicides, pesticides and mixtures thereof.

In order for such crosslinked elastomeric coatings to be functional, they have to meet one or more of the following criteria: the coating material should show improved barrier properties; the applied thin coating should be a continuous film with few or no defects, i.e., be substantially free of pinholes. The term "pinholes" as used herein is understood to mean discontinuities in the polymeric coating of such size and shape as to prevent osmotic pressure buildup.

Fracture fluids commonly used in fracturing operations include water-based brine fluids containing a water-soluble polymer such as hydroxypropyl guar cross-linked with a transition metal salt as is well known in the art. Other polymers used to viscosify aqueous fracturing fluids are hydroxyethyl cellulose, polyacrylamide, gum karaya and the like. In addition, fracturing fluids may be viscous oils or oil-based emulsions. Viscosification of these is accomplished via addition of surfactants, asphalts, fatty-acid soaps, other emulsion and foam stabilizing agents and the like.

Typical propping agents used in hydraulic fracturing for retaining the integrity of the fractures are nut shells, plastic beads, glass beads, sand, sintered alumina, urea prills and aluminum spacers. The concentration used depends on the size and shape of the proppant, the type of formation being fractured, the carrying capacity of the fracturing fluids and the desired permeability of the resistant fractures. The concentrations generally range from 1 to 30 lb. per gal.

Other additives commonly used in hydraulic fracturing fluids are fluid loss or wall building agents such as starch, bentonite, silica flour, guar gum and surfactants; friction-reducing agents such as small amounts of high molecular weight linear polymers such as polyacrylamide; specific gravity increasing agents; bactericides; scale-removal/prevention agents, and surfactants or alcohol to reduce interfacial tension and the resistance to return flow.

The following examples are illustrative of the invention.

EXAMPLE 1

This example sets forth the preparation of two sulfonated EPDM terpolymers which are subsequently neutralized to form the zinc salt (SEPDM).

Sulfonated EPDM terpolymers are prepared by sulfonating a terpolymer comprising about 50 weight percent ethylene, about 5 weight percent ethylidene norbornene (ENB) and the balance being propylene. This material is available from Uniroyal under the trademark "ROYALENE" 521. Sulfonation was carried out by treatment with acetyl sulfate and neutralization with ZN (Ac)$_2$ according to the procedure of U.S. Pat. No. 3,836,511, herein incorporated by reference.

Two species of neutralized elastomer were produced, one having 10 meq. of zinc sulfonate groups per 100 grams of the EPDM terpolymer (hereinafter designated ZSE-10), and the other having 25 meq. of zinc sulfonate groups per 100 grams of the EPDM terpolymer (hereinafter designated ZSE-25).

EXAMPLE 2

A solution of a zinc neutralized sulfonated EPDM polymer was prepared for application as a coating solution. The solution cast coating was applied over urea samples in order to measure the barrier properties for urea extraction by water through the thin film coating.

Solution A was prepared by mixing 2.5 grams of a zinc sulfo-EPDM similar to the one described in Example 1 (Uniroyal Ionic Elastomer 2560), containing 25 meq. of sulfonte groups per 100 grams of ethylene propylene ethylidenenorbornene terpolymer, neutralized with zinc, in 100 grams of a solvent consisting of 97.5% toluene and 2.5% methanol reagent.

To determine the barrier properties of films formed from the solution of the sulfonated EPDM terpolymer, urea slides were coated for immersion tests. The procedures for preparing coated samples of urea slides and conduction immersion tests are described as follows:

Urea samples were prepared by depositing reagent grade urea (Fischer Scientific) over microscope glass slides. This was done by dipping glass slides into molten urea at a temperature of about 135°–145° C., followed by cooling and solidification of the urea layer. The urea layer was built up to about 7 mm. by 4 to 5 successive dipping and cooling cycles. These urea samples were then coated by a polymeric film using a second dipping procedure. Urea slides were repeatedly dipped into polymeric solutions such as those described above, followed by drying in a vacuum oven at 70° C. for about 3 hours. The dipping and drying cycles were repeated until the film thicknesses shown in Table I were obtained.

The barrier properties of the various polymeric films were determined by immersion of each coated urea slide in about 100 g. of deionized water at room temperature.

The amount of urea released into the water was determined by recovering the urea after evaporating the water. Each sample was initially immersed for 1 day, followed by immersion in fresh water for 3 days and for weekly intervals thereafter.

Table I shows the permeabilities of urea solutions extracted from the coated urea slides and immersed in water at room temperature. The permeabilities of the coating materials were determined by applying Fick's law of diffusion at steady state. Fick's law states that:

$$J_m = DA \frac{C}{X}$$

where $J_m$=mass flux (loss) through the film or membrane, A=transport area, C=concentration gradient, X=film or membrane thickness, and D=membrane diffusivity constant which is equal to the ratio of permeability (P) over the solubility ratio (K) of urea in the membrane and in water.

The performance of the zinc-sulfo-EPDM film was compared with that formed from solutions of other commercial coating materials. The first commercial coating solution was a tung oil solution made by Formby of Mississippi at 30 weight percent solids in petroleum distillate. The second commercial coating solution was linseed oil modified polyurethane Type I made by Minwax Paint Co. of New Jersey at 45% solids in petroleum distillate. The two commercial coatings were cured at 70° C. for 48 hours after coating.

TABLE 1

PERMEABILITY OF UREA SOLUTION FROM COATED UREA SLIDES IN WATER AT ROOM TEMPERATURE

| Sample No. | Coating Material | Ratio wt/wt | Film Thickness Microns | Permeability (P = DK) cm$^2$/sec |
|---|---|---|---|---|
| 141-3 | Tung Oil | — | 75 | 4.3 × 10$^{-9}$ |
| 141-6 | Tung Oil | — | 125 | 7.6 × 10$^{-9}$ |
| 158-4 | Polyurethane | — | 100 | 1.3 × 10$^{-9}$ |
| 158-5 | Polyurethane | — | 40 | 2.1 × 10$^{-9}$ |
| 28-14 | ZSE-25 | — | 10 | 9.6 × 10$^{-13}$ |
| 84-1 | ZSE-25 | — | 25 | 8.6 × 10$^{-13}$ |
| 84-2 | ZSE-25 | — | 30 | 8.6 × 10$^{-13}$ |

The permeability of urea solutions through the zinc sulfonated EPDM terpolymer film was found to be about 3 orders of magnitude lower than either that of tung oil or that of polyurethane. The use of tung oil and polyurethane as release control coatings on water soluble fertilizers is disclosed in U.S. Pat. Nos. 3,321,298 and 3,223,518.

The present example shows that thin films of zinc sulfonated EPDM terpolymer complex provide a much better barrier than do commercial materials.

EXAMPLE 3

In this example, thick coatings of reagent sulfur and paraffin wax (M.P.=55° C.) were applied through melting (i.e., these materials were melted at about 5° C. to 10° C. above their melting point and then after quickly dipping urea samples in the melt, the hot coated sample was brought to room temperature slowly). This layering procedure was repeated three to four times to obtain a thick coating. Both unsulfonated EPDM and PEVAC (a copolymer of ethylene and vinyl acetate containing about 60 weight percent ethylene) were applied from 2.5% polymer solutions in the same solvent as the solvent for the sulfo EPDM.

Figure 1:
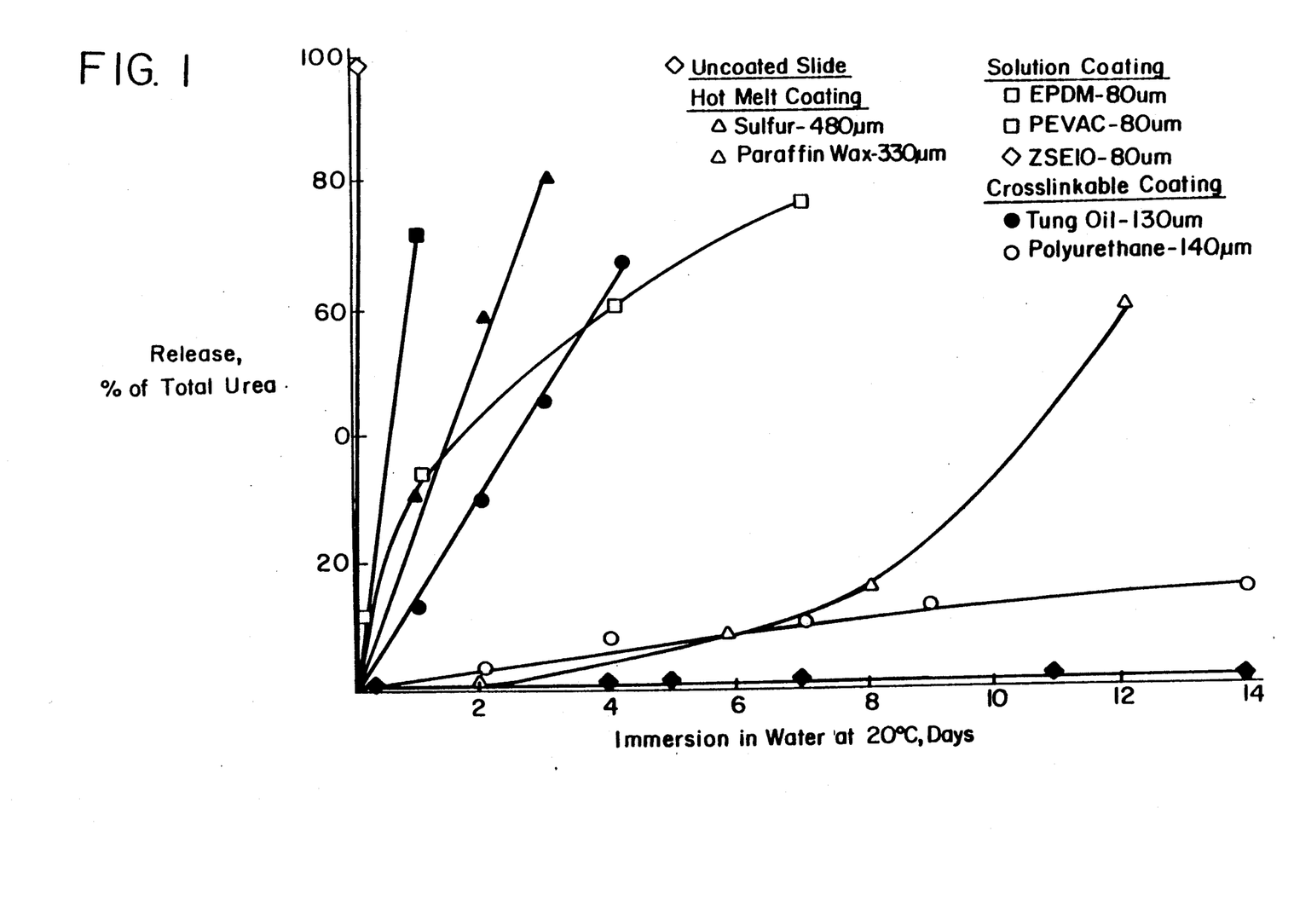
FIG. 1 illustrates release versus immersion time in water for the coatings of the instant invention and control samples.

FIG. 1 shows that ZSE-10 offered the best protection preventing the dissolution of urea in water at room temperature (about 22° C.). Uncoated urea dissolved quickly in water, but even thick coatings of sulfur, unsulfonated EPDM and PEVAC on similar samples did not sufficiently protect urea from dissolving in water. Paraffin wax and modified polyurethane Type 1 (made by Minwax Paint Company) protected urea from dissolving in water for at least six days. ZSE-10, however, preformed the best in protecting urea from water dissolution.

EXAMPLE 4

Fluidized Bed Process For Urea Coating

The urea coated sodium persulfate granules were produced using the following procedure. 4 kg of 20-30 mesh sodium persulfate were introduced into a fluid bed coating machine, including a Wurster insert, manufactured by Glatt Air Techniques Inc., model number GPCG-5. The sodium persulfate bed was fluidized by passing 130 scfm heated air (48° C.) through the bed. After the bed reached a temperature of 30° C., a 10 weight percent solution of urea in water and methanol was sprayed into the sodium persulfate granules at the Wurster insert entrance. The spray nozzle used was a commercial two fluid nozzle using air at 3 bars pressure to form an atomized spray regime in the Wurster insert.

The spraying was continued at 20 g/min rate until the required thickness of urea was built up on the sodium persulfate, i.e. approximately 46 minutes for a coating level of 2 wt. % urea on the sodium persulfate.

After the solution was sprayed onto the granules in the Wurster insert, the thinly coated granules were blown by the heated air upwards into the drying section of the machine. Here, the solvents were evaporated by the hot stream, leaving a thin coat of urea on the granules. The dried granules fell back into the fluid bed and then reentered the Wurster insert where the coating process was repeated. Thus, multiple films and layers of the urea were built up until the spraying was stopped at a 2 wt % coating.

EXAMPLE 5

Fluidized Bed Process for SEPDM Coating

SEPDM coated sodium persulfate granules were produced using the following procedure:

4 kg of 20-30 mesh sodium persulfate were introduced into a fluid bed coating machine, including a Wurster insert, manufactured by Glatt Air Techniques Inc., model number GPCG-5. The sodium persulfate bed was fluidized by blowing 130 scfm of heated air (45° C.) through bed. After the bed reached a temperature of 30° C., a 1.25 weight percent solution of the SEPDM polymer in toluene and methanol cosolvent was sprayed onto the sodium persulfate granules at the Wurster insert entrance. The spray nozzle used was a commercial two fluid nozzle using air at 3 bars pressure to form an atomized spray regime in the Wurster insert.

The spraying was continued at 40 gm/min rate until the required thickness of polymeric coating was built up on the sodium persulfate, i.e., approximately 80 minutes per a coating level of 1 weight percent polymer on the sodium persulfate.

After the solution was sprayed onto the granules in the Wurster insert, the thus coated granules were blown by the heated air upwards into the drying section of the machine. Here, the solvents were evaporated by the hot stream, leaving a thin coat of dried polymeric material on the granules. The dried granules fell back into the fluid bed and then re-entered the Wurster insert where the coating process was repeated. Thus, multiple films or layers of the sulfonated polymeric coating was built up until the spraying was stopped.

After a 1 weight % coating was put on the granules, a 60 gram sample was taken and marked as 1 wt % of SEPDM on sodium persulfate. The spraying was continued until 2 wt % SEPDM was added. The spraying was then stopped and the coated granules were dried with the hot air for 5 minutes.

EXAMPLE 6

2.34 grams of 20 to 30 mesh granulated sodium persulfate coated with 1 and 2 weight percent SEPDM terpolymer as set forth in Example 4, were placed in 30 grams of a 30 weight percent barium chloride solution. The sodium persulfate converts to approximately 5.5 grams of barium sulfate, as shown by the uncoated persulfate data at 250° F./121° C. The coated solids, after remaining at the desired release temperature and time, were separated from the finer barium sulfate solids and the water by pouring through a 40 mesh sieve. The sieve was thoroughly rinsed with water to remove any solids or liquids clinging to coated solids. The barium sulfate in water plus any water soluble salts were left overnight to separate. The free water was then decanted from the solid barium sulfate. The remaining water was removed by drying in an oven at 150° F. (65° C.) overnight. The remaining barium sulfate was weighed and recorded in Table II. The percent sodium persulfate released in given by using the uncoated weight at 100% released.

EXAMPLE 7

The following Example illustrates the preparation of a sodium sulfonated polystyrene thermoplastic polymer (SPS) which may be used as an additional layer over the SEPDM layer.

Sulfonated polystyrene is manufactured as a 30% suspension/emulsion in water. The monomers of sodium styrene sulfonate (NaSS) and styrene are added to water (oxygen free) containing surfactant (sodium lauryl sulfate), catalysts (potassium persulfate and sodium bisulfate) and chelates (EDTA) for iron. The mixture is reacted at 180° F. (82° C.) for 3 hours. After the reaction is complete, an antioxidant (BHT) is added. The final product is 30% SPS suspended/emulsified into water. The polymer is oil soluble since only 3.8% NaSS is present in the polymer.

These coated seed particles may be further coated with the elastomer and elastomer/thermoplastic combi-

TABLE II

Release of Coated Sodium Persulfate in Water at Time and Temperature

Release of Coated Sodium Persulfate by Weight in grams of Converted Barium Sulfate and by Percent versus Time in hours

| Coated Sodium Persulfate | Temperature (°F./°C.) | 4 weight (g) | % | 8 weight (g) | % | 16 weight (g) | % |
| --- | --- | --- | --- | --- | --- | --- | --- |
| Sodium Persulfate Uncoated | 75/24 | 0.88 | 100 | 0.82 | 100 | 0.86 | 100 |
|  | 150/65 | 4.51 | 100 | 4.02 | 100 | 4.60 | 100 |
|  | 250/121 | 5.17 | 100 | 5.43 | 100 | 5.30 | 100 |
| Sodium Persulfate Plus 1 weight Percent S-EPDM Coating | 75/24 | 0.26 | 30 | 0.60 | 73 | 0.67 | 78 |
|  | 150/65 | 1.19 | 26 | 1.76 | 44 | 3.19 | 69 |
|  | 250/121 | 4.53 | 88 | 4.46 | 82 | 4.48 | 85 |
| Sodium Persulfate Plus 2 weight Percent S-EPDM Coating | 75/24 | 0.20 | 23 | 0.38 | 46 | 0.60 | 70 |
|  | 150/65 | 1.03 | 23 | 1.76 | 44 | 3.09 | 67 |
|  | 250/121 | 4.48 | 87 | 4.37 | 80 | 4.36 | 82 |
| Sodium Persulfate Plus 2 weight percent S-EPDM plus ½ weight percent SPS | 75/24 | 0.22 | 25 | 0.40 | 49 | 0.51 | 59 |
|  | 150/65 | 1.12 | 25 | 1.66 | 41 | 2.99 | 65 |
|  | 250/121 | 4.06 | 79 | 4.38 | 81 | 4.33 | 82 |

EXAMPLE 8

The multilayer coating with sulfonated polystyrene polymer is achieved by spraying the sodium sulfonated polystyrene (SPS), as prepared in Example 7 or a dilution thereof, onto the cascading stream of granules coated as described above with the sulfonated EPDM terpolymer. The SPS polymer is a suspension/emulsion in water so it can easily be diluted with water to the proper level for spraying multilayer coats.

After 2 wt. % of SEPDM was put on the sodium persulfate as set forth in Example 4, a ½ wt. % of SPS was added as a top layer. The conditions were kept the same as in Example 5 above except that a 5 wt. % SPS solution, a dilution of 30 wt. % SPS solution in water, was sprayed onto the 2 wt. % SEPDM coated sodium persulfate at a rate of 40 gm/min. After approximately 9 minutes, a ½% SPS coating was completed. The spraying was stopped and the product was dried with hot air another 5 minutes. The product comprised 2 wt. % SEPDM plus ½ wt. % SPS on sodium persulfate.

The release properties of this material were also evaluated as in Example 6 above and are reported as the last entry in Table II.

EXAMPLE 9

Sodium persulfate was layered/coated on urea seed granules by using the following procedure: 1.6 kg of 2.5 mm OD urea granules were introduced into a fluid bed coating machine with a 2 liter bowl, manufactured by Glatt Air Techniques Inc., model number GPCG-1. The urea bed was fluidized by blowing approximately 130 scfm of heated air (45° C.) through the bed. After the bed reached 30° C., a 10 wt % sodium persulfate solution in water and methanol was sprayed onto the urea fluidized to the top of the bowl with a top spray nozzle. The spray nozzle used was a commercial two-fluid nozzle using air at 2 bars pressure to form an atomized spray regime in the bowl.

The spraying was done at 20 gm/min and continued until approximately a 5 wt % coating of sodium persulfate was added. The spraying took approximately 40 minutes to add the 5 wt % level. The product was urea particles coated with 5 wt % sodium persulfate.

nation as set forth above.

EXAMPLE 10

Fluidized Bed Process Multilayer Coating of SEPDM and SPS

SEPDM and SPS multilayer coated sulfamic acid granules were produced using the following procedure:

Six kilograms of 20–30 mesh sulfamic acid were introduced into a fluid bed coating machine, including a Wurster insert, manufactured by Glatt Air Techniques Inc., Model number GPCG-5. The sulfamic acid was fluidized by blowing 130 scfm heated air (55° C.) through the bed. After the bed reached a temperature 40° C., a 1.25 weight percent solution of the SEPDM polymer in toluene and methanol cosolvent was sprayed onto the sulfamic acid granules at the Wurster insert entrance. The spray nozzle used was a commercial two fluid nozzle using air at 3 bars pressure to form an atomized spray regime in the Wurster insert.

The spraying was continued at a 40 gm/minute rate until the required amount of polymeric coating was built up on the sulfamic acid, i.e., approximately 120 minutes for a coating level of 1 wt. % polymer on the sulfamic acid.

After the solution was sprayed on the granules in the Wurster insert, the thus coated granules were blown by the heated air upwards into the drying section of the machine. Here, the solvents were evaporated by the hot stream, leaving a thin coat of dried polymeric material on the granules. The dried granules fell back into the fluid bed and then re-entered the Wurster insert where the coating process was repeated. Thus, multiple films or layers of the sulfonated polymeric coating were built up until the spraying was stopped. built up until the spraying was stopped.

After a 1.5 wt. % coating of SEPDM was on the granules, a sample was taken and marked 1.5 wt. % SEPDM on sulfamic acid.

The remaining 1.5 wt. % of SEPDM coated sulfamic acid was then coated with ½ wt. % of SPS as a top layer to prevent agglomeration of particles and allow the build up of multilayers of SEPDM and SPS. The conditions were kept the same as above except a 5 wt. % SPS solution, a dilution of 30 wt. % SPS solution in water, was sprayed onto the 1.5 wt. % SEPDM coated sulfamic acid at a rate of 40 gm/min. After approximately 9 minutes the ½ wt. % SPS coating was completed. The spraying was stopped and the product dried with hot air another 5 minutes. A sample was taken marked 1.5 wt. % SEPDM plus ½ wt. % SPS on sulfamic acid.

The process was continued and samples taken with varying and alternating multilayers of SEPDM and SPS until a total of 6 wt. % SEPDM and 2.5 wt. % SPS were sprayed in layers on the sulfamic acid. The amount and type of each coated sulfamic acid sample as well as the top layer (outer layer) is given in first column in Table III.

breaking the gel of the viscous brine solution. The coated breaker was compared with the base gel without breaker and with the uncoated oxidizer added to the base gel.

The viscous brine was made by adding 50 pounds per 1000 gallons of hydroxypropyl guar (HPG) to a 2 wt % KCl solution.

The viscosities were measured with a Fann 35 VG viscometer at 311 $sec^{-1}$ (300 rpm) shear. Viscosities were taken during heatup to 175° F. (79.4° C.) and versus time at 175° F. Two hundred milliliters of gelled brine was used for the tests. The coated breaker sodium persulfate at 8 and 4 pounds per 1000 gallons (PPT) of gelled brine were added to the Fann 35 VG meter mea-

TABLE III
RELEASE OF COATED SULFAMIC ACID

| Coated Sulfamic Acid Sample (amount/type of coating) | Weight Percent of Sulfamic Acid Released into Water from Coated Sample as a Function of Time and Temperature | | | | | | | | |
|---|---|---|---|---|---|---|---|---|---|
| | 4 Hours | | | 8 hours | | | 16 hours | | |
| | 75° F. | 150° F. | 250° F. | 75° F. | 150° F. | 250° F. | 75° F. | 150° F. | 250° F. |
| Uncoated | 100 | 100 | 100 | 100 | 100 | 100 | 100 | 100 | 100 |
| 1.5 wt. % Z-SE | 100 | 100 | 100 | 92 | 86 | 100 | 100 | 100 | 100 |
| 1.5 wt. % Z-SE + 0.5 wt. % SPS (SPS Top) | 82 | 100 | 100 | 100 | 100 | 100 | 100 | 100 | 100 |
| 3 wt. % Z-SE + 0.5 wt. % SPS (Z-SE Top) | 53 | 100 | 98 | 76 | 97 | 100 | 92 | 100 | 100 |
| 3 wt. % Z-SE + 1 wt. % SPS (SPS Top) | 45 | 100 | 100 | 66 | 100 | 100 | 95 | 100 | 100 |
| 4 wt. % Z-SE + 1 wt. % SPS (Z-SE Top) | 26 | 91 | 100 | 42 | 93 | 99 | 69 | 100 | 98 |
| 4 wt. % Z-SE + 1.5 wt. % SPS (SPS Top) | 28 | 71 | 99 | 62 | 97 | 99 | 70 | 99 | 100 |
| 5 wt % Z-SE + 2 wt. % SPS (SPS Top) | 25 | 62 | 83 | 36 | 89 | 78 | 61 | 97 | 97 |
| 6 wt. % Z-SE + 2 wt. % SPS (Z-SE Top) | 14 | 40 | 59 | 16 | 62 | 99 | 26 | 84 | 92 |
| 6 wt. % Z-SE + 2.5 wt. % SPS (SPS Top) | 16 | 40 | 71 | 24 | 64 | 100 | 41 | 88 | 96 |

Note:
Z-SE is Zn sulfo EPDM sprayed a 1.25 wt. % polymer solution in toluene/methanol at 97/3 weight ratio.
SPS is Na sulfo polystyrene sprayed from a 5 wt. % polymer water external emulsion.

EXAMPLE 11

Coated 20 to 30 mesh granulated sulfamic acid samples with the multilayer coating reported above in Example 10 and in Table III were placed in water for release studies. 2.0 grams of coated sulfamic acid samples were placed in 20 grams of deionized water.

The coated solids, after remaining at the desired release temperature and time, were separated from the water containing the released sulfamic acid by pouring the solid plus water through a 100 mesh sieve. The sieve was thoroughly rinsed with water to remove any released sulfamic acid clinging to the coated solids. The water was then evaporated in an oven at 75° C. The percent of sulfamic acid released for each coating level is given in Table III.

EXAMPLE 12

A viscous (gelled) 2 weight percent potassium chloride solution was used to test the effects of coated breaker chemical (oxidizer) on reducing the viscosity or suring cup. Also 0.5 PPT of uncoated sodium persulfate were added in one test to show the effect of the SEPDM/SPS coatings on the release of sodium persulfate with time at 175° F. The base gelled brine with not additives were measured for comparisons.

Table IV shows the advantage of coating the sodium persulfate to delay the release of the oxidizer at a temperature of 175° F.

The uncoated sodium persulfate broke the gel to 5 cp in 30 minutes whereas the coated sodium persulfate at 4 and 8 PPT were only 14 and 8 cp after 160 minutes. Comparison with the untreated base gel shows the oxidizers all break the gel.

The following example illustrates that breaker chemicals coated with the ionically and covalently cross-linked neutralized sulfonated polymers of the invention exhibit a more prolonged and controlled release rate as compared with similar chemicals coated with neutralized sulfonated polymers which are only ionically crosslinked.

TABLE IV

EFFECT OF COATED OXIDIZER (SODIUM PERSULFATE) ON VISCOSITY OF HYDROXYPROPYL GUAR (HPG) GELLED 2% POTASSIUM CHLORIDE (KCL) SOLUTION

1. Viscous brine made by adding 50 pounds per 1000 gallons (PPT) of HPG to 2% KCl solution (0.6 g HPG per 100 ml solution).
2. Viscosities measured with Fann 35 VG viscometer at 311 sec$^{-1}$ (300 rpm).
3. Viscosities taken during heatup to 175° F. and versus time at 175° F.
4. Two hundred milliliters of gel treated with oxidizer for tests.

Viscosity (cp) of Gelled Solution with Oxidizers-Normalized*

| Temperature (°F.) | Time (min) | No Oxidizer | Coated Oxidizer #2 (8 ppt) | Coated Oxidizer #2 (4 ppt) | Uncoated $Na_2S_2O_3$ (½ ppt) |
|---|---|---|---|---|---|
| 80 |  | 50.0 | 50.0 | 50.0 | 50.0 |
| 100 |  | 47.2 | 46.3 | 47.5 | 47.0 |
| 120 |  | 43.4 | 42.6 | 44.1 | 43.1 |
| 140 |  | 39.2 | — | 38.2 | 37.6 |
| 160 |  | 33.5 | — | 33.3 | 31.7 |
| 175 | 0 | 30.2 | 28.9 | 29.2 | 28.2 |
|  | 5 | 29.2 | 28.4 | 29.9 | 18.3 |
|  | 10 | 29.2 | 28.4 | 29.9 | 13.4 |
|  | 20 | 30.2 | 26.8 | 28.9 | 7.9 |
|  | 30 | 30.2 | 24.2 | 27.9 | 5.4 |
|  | 40 | 30.2 | 22.1 | 25.5 |  |
|  | 60 | 30.2 | 18.4 | 22.5 |  |
|  | 80 | 30.2 | 15.8 | 19.6 |  |
|  | 100 | 30.2 | 14.7 | 17.6 |  |
|  | 160 | 30.2 | 7.9 | 13.7 |  |

Coated Oxidizer #1 (LAM 2J) Urea = 83.4%, Persulfate = 9.0%, S-EPDM = 3.1% & SPS = 2.5%
Coated Oxidizer #3 (LAM 1G) Persulfate = 82.0%, Urea = 4.3%, S-EPDM = 2.0%, SPS = 2.0%
*Normalized to 50 cp at 80° F.

EXAMPLE 13

Sodium persulfate (NaPS) granules were coated with a zinc salt of sulfonated EPDM (SEPDM) elastomer in accordance with the process set forth in Example 5 and using the conditions as set forth.

The coating and drying process were repeated a number of times until a dry coating weight of 9 weight percent of SEPDM on the NaPS granules was achieved.

EXAMPLE 14

The coated granules prepared in accordance with Example 13 were uniformly sprayed with a solution of 25 weight percent of sulfur monochloride dissolved in toluene. This corresponded to a sulfur monochloride level equivalent to 5 weight percent based on the polymer content of the coating. The toluene was then evaporated leaving a dried crosslinked coating.

EXAMPLE 15

As in Example 12, a viscous (gelled) 2 weight percent potassium chloride solution was used to test the effects of coated breaker chemical (oxidizer) and covalently crosslinked coated breaker on reducing the viscosity of breaking the gel of the viscous brine solution. The coated and covalently crosslinked coated breakers were compared with the base gel without breaker and with uncoated oxidizer added to the base gel.

The viscous brine was made by adding 40 pounds per 1000 gallons of hydroxypropyl guar (HPG) to a 2 weight percent KCl solution. A transition metal salt (Kyzer GBA) was added at a level of 1 weight % to crosslink the gel.

The viscosities were measured with a Fann 50C viscometer at 170 sec$^{-1}$ (100 rpm) shear. The viscosities were taken during heatup to 200° F. (93.3° C.) and versus time at 200° F. Forty milliliters of gelled brine was used for these tests.

Four evaluations of viscosity properties over this temperature range were made. The first (1) represents the base brine gel wherein no breaker chemical is added; the second evaluation (2) is that where uncoated sodium persulfate is mixed in at a level of about 0.013 grams per 40 ml of brine gel; the third evaluation (3) is that wherein the coated granules of Example 13 were mixed in at a level of 0.018 grams per 40 ml of brine gel; and the fourth evaluation (4) is that wherein the granules coated with the ionically and covalently crosslinked coating of Example 14 were mixed in also at a level of 0.018 grams per 40 ml of brine gel.

Figure 2:
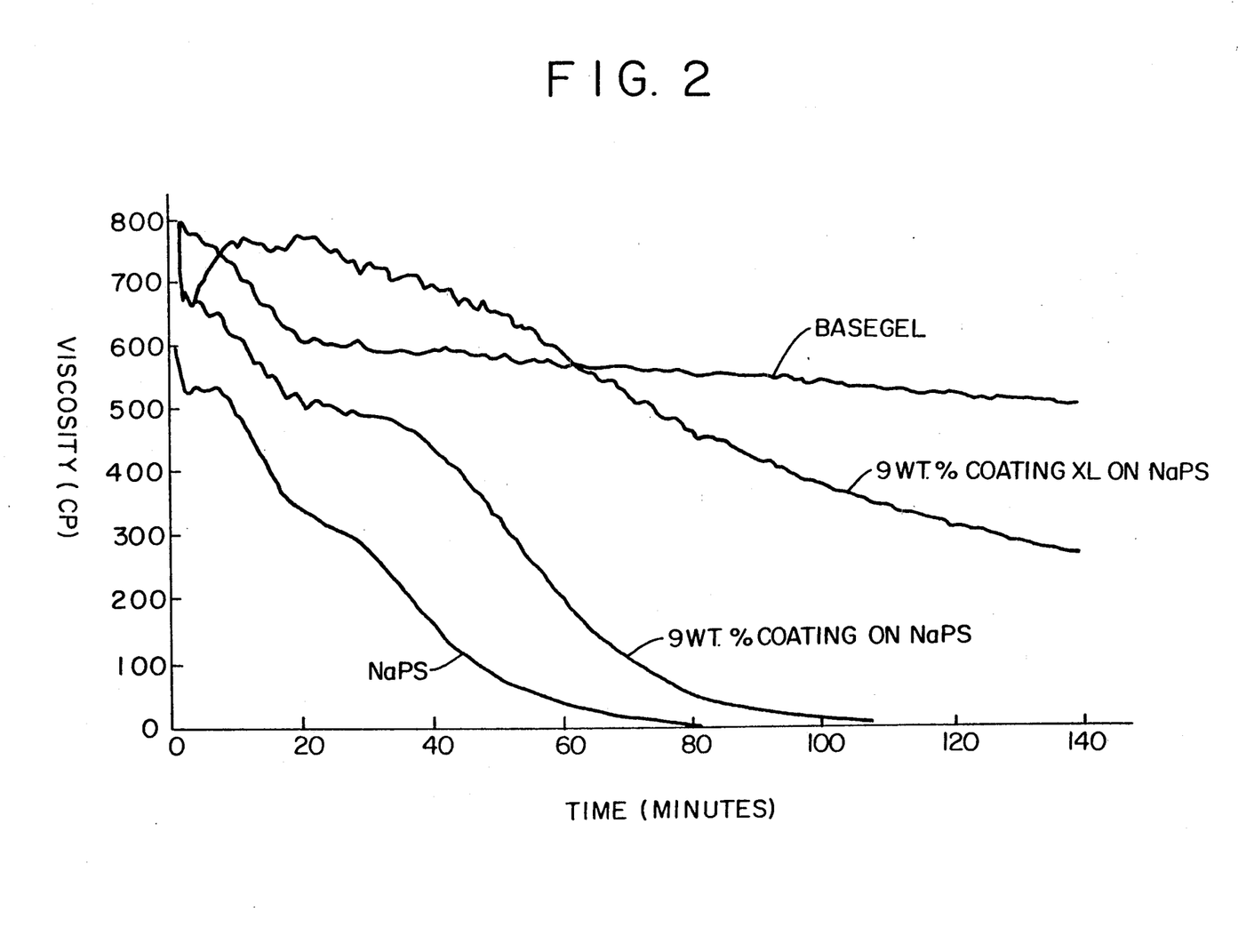
FIG. 2 illustrates fracturing fluid gel viscosity versus time with and without the addition of various breaker chemicals.

A plot of viscosity versus temperature is illustrated in FIG. 2. The base gel (1) is represented by the curve highest at the right side of the figure. The second gel (2) is represented by the lowest curve and shows a marked and rapid drop off of viscosity due to the rapid action of the uncoated NaPS on the gel. The third gel (3) is represented by the curve third highest at the right side of the figure and illustrates that the elastomer coating of Example 13 definitely slows the release of the NaPS chemical. The fourth gel (4) is represented by the remaining curve which illustrates that the convalently crosslinked coating of Example 14 further dramatically reduces the release rate of the chemical and extends the duration of release over a longer time period.

Coatings of ionically and covalently crosslinked neutralized sulfonated polymers on breaker chemicals which are used in fracturing fluids will act as barriers to water soluble components of the fracturing fluid thereby shielding the breaker chemical from the premature release of the breaker chemical into the fracturing fluid, and permit a controlled time release of the chemical.

Because of their unique barrier properties, ionically and covalently crosslinked sulfonated polymers can be used to make cost effective controlled release breaker chemicals. The benefits obtained by the use of these coatings can include labor savings, increased breaker utilization efficiency, time savings and reduction in residual damage to the well caused by residual gels.

What is claimed is:

1. An encapsulated particulate composition comprising:
   (a) a solid particulate substrate;
   (b) a coating substantially free of pinholes comprising an ionically and convalently crosslinked neutralized sulfonated elastomeric polymer having a thickness of at least about 1 micron deposited on the surface of particles of said substrate, wherein said crosslinked neutralized sulfonated polymer encapsulates said substrate, wherein said crosslinked neutralized sulfonated polymer is permeable to said substrate at conditions of use and said crosslinked neutralized sulfonated polymer is non-reactive to said substrate, and
   (c) a layer of thermoplastic polymer overcoating said coating.

2. The composition of claim 1 wherein said thermoplastic polymer is a neutralized sulfonated styrene polymer.

3. The composition of claim 2 wherein the thickness of said layer of thermoplastic polymer is within the range of from about 1 to about 20 microns.

4. The composition of claim 1 wherein said crosslinked elastomeric polymer is a neutralized sulfonated EPDM terpolymer.

5. The composition of claim 1 wherein said substrate is selected from the class consisting of herbicides, fertilizers and pesticides.

6. The composition of claim 5 wherein said substrate is urea.

* * * * *